Dec. 5, 1933.　　　　　E. L. WILSON　　　　　1,938,507
DEVICE CAPABLE OF BEING SET INTO TWO OR MORE POSITIONS
Filed March 18, 1931
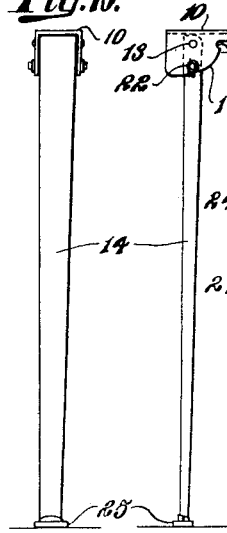
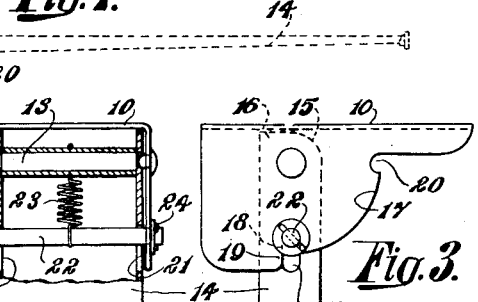
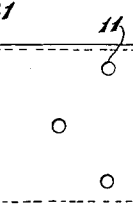
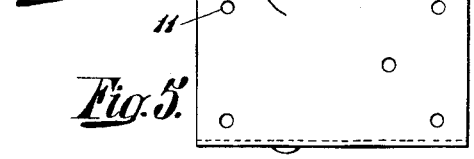
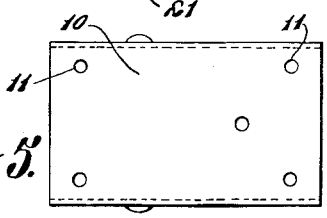
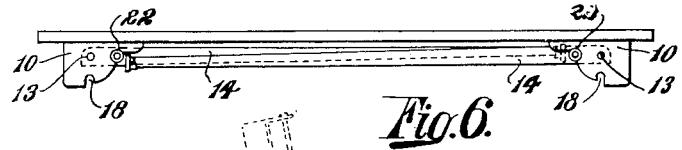
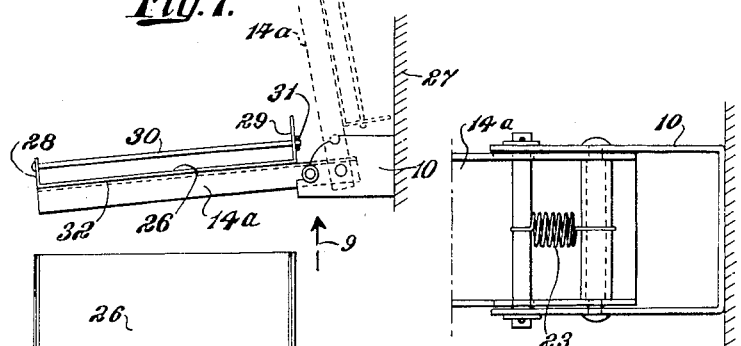
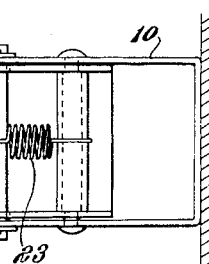
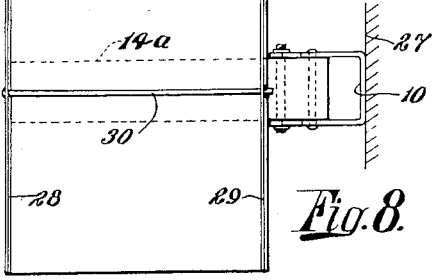
INVENTOR
Ernest Lodge Wilson
BY
B. Singer
ATTORNEY Patented Dec. 5, 1933

1,938,507

UNITED STATES PATENT OFFICE 1,938,507

DEVICE CAPABLE OF BEING SET INTO TWO OR MORE POSITIONS

Ernest Lodge Wilson, Wallington, England

Application March 18, 1931, Serial No. 523,632, and in Great Britain March 27, 1930

1 Claim. (Cl. 287—14)

This invention relates to devices capable of being set into two or more positions and is of the type comprising two mutually pivoted parts consisting of a bracket member of channel shape having means for securing the bracket to a suitable article or otherwise, and a member attached to the bracket by means of a pivot extending across the flanges of the channel, the said flanges being formed with notches which are engaged by a spring detent device carried by the pivoted member, to retain the pivoted member in desired extreme positions or in any intermediate position between the extremes relative to the bracket member.

In practical constructions, the device, or what may be termed the element of the device, comprises a bracket member of channel shape, the base of the channel having holes in desired positions for the passage of wood screws or otherwise by which the bracket can be attached in position on a wall, door cabinet, table top or otherwise. The sides or flanges of the channel extend laterally and are apertured in desired positions to receive a circular pin or rod. The movable arm, bracket, leg or other member is of channel section and such a width that it fits between the flange and the bracket and towards one end the flanges of the arm or the like are apertured and the parts so disposed that the apertures in the flanges of the relatively fixed bracket are aligned with the apertures of the flanges of the arm or the like. A rod or pin is passed through these aligned apertures and one end of the rod is preferably formed with a snap or other head and when the parts are placed in position the end of the rod projects on the exterior of the channel bracket. The rod is retained in position by riveting over this end or by screwing thereon a nut or by means of a split pin or otherwise, and the arrangement is preferably such that the flanges of the fixed bracket channel grip the flanges of the arm in a frictional manner.

The flanges of the fixed bracket channel are given a required shape which includes a somewhat quadrant-shaped portion, having a centre coaxial with the axis of the arm or the like. Each such flange has a similar shape and the quadrant shaped portions are terminated by notches which project into the material of the flange and are preferably of gradually diminishing width. The bounding edges of the notches on the sides remote from the quadrant extend, beyond the bounding edges of the notches on the other sides to form stops.

Each flange of the channel forming the leg, arm or other movable member in a desired position has an elongated slot, the slot in one flange coming opposite to the slot in the other flange. A pin or rod of circular or other section passes through these slots and across the channel of the movable member (such as the pivoted arm) and the ends project a desired extent. The slot is in such a position that when the pin is at the outer extremity of a slot the movable member can be turned so that the projecting portions of the pin clear the quadrants of the bracket, but come against the longer side of the notches before referred to, which act as a stop. The pin is of such diameter or shape that its projecting ends can enter the notches and make contact with the sides thereof, preferably before coming into contact with the base of the notch. A tension spring or springs connect the pivot pin with the pin passing through the slots. These pins in the portion lying between the channel by which they are carried, may carry abutments formed by washers and split pins, so that the said slot engaging pins are retained in position.

The arrangement of the parts is such that in one extreme position of movement the projecting portions of the rod or pin, which comes parallel to the pivot pin, are located in the recesses at one extremity of the quadrant and are held there by the tension spring means. When it is desired to bring the pivoted arm or the like to the other extreme position, it is turned and the pressure of turning is sufficient to cause the pin to spring from the recess. The projecting ends of the pin or rod then pass over the surfaces of the quadrants until the other recesses or notches are reached, when the spring or springs pull this detent rod into said notches. The detent rod is held firmly in position, preferably against the tapering sides of the notches by means of a spring and thus the parts are held in position.

Such mechanism as that particularly described is particularly suitable for legs for furniture and the like, enabling such legs readily to be attached in position and to be moved to and retained in an active supported position or folded into an out-of-action position. In general, such a leg comprises two main parts consisting of the leg proper and the supporting bracket for the leg, to which the leg is pivotally attached, with means for attaching the bracket in position on the article of furniture. The spring detent and release devices are associated between the leg and the bracket as hereinbefore explained.

It should be understood however that such a mechanism is not limited to its application to the legs of furniture and the like, but may be applied to any suitable device which it is desired to set into two positions, and another of such examples comprises a desk, shelf or the like adapted to be turned into two positions, one where it is folded out of the way and the other where it is in the position for use. The fixed bracket in this case is attached by the base of its channel to a wall or other surface so that the arm can be turned up or down into one extreme position and out into another extreme position. Such arm in this instance has riveted or otherwise attached thereto the supporting shelf or slope, which may be flanged at suitable edges, and be adapted to receive a book or books or otherwise.

In order that the invention may be better understood, it will now be described with reference to the accompanying drawing in which:—

Fig. 1 shows an elevation of a leg for a table and its bracket constructed according to one embodiment of the invention, the leg being shown in full lines in the in-action position and in dotted lines in the out-of-action position.

Fig. 2 shows a side elevation of Fig. 1.

Fig. 3 shows the upper portion of Fig. 1 to a larger scale.

Fig. 4 shows the upper portion of Fig. 2 to a larger scale and partly in section.

Fig. 5 shows a plan of Fig. 3.

Fig. 6 shows in side elevation a table top with legs constructed according to the invention at each corner thereof in the folded condition.

Fig. 7 shows in elevation another embodiment of the invention illustrating a support for a book such as a telephone directory, in full lines in the turned into action position and in dotted lines in the out of action position.

Fig. 8 shows a plan of Fig. 7.

Fig. 9 shows a fragmentary under plan to a larger scale in the direction of the arrow 9, Fig. 7.

The leg shown in Figs. 1 to 6 comprises a bracket 10 of inverted channel shape in end elevation, the upper portion or base of the channel being of suitable shape and having holes 11 in desired positions for the passage of wood screws or otherwise by which the bracket can be attached in position beneath an article of furniture, for example beneath a table top, such as 12, Fig. 6. The sides or flanges of the channel extend downwardly and are apertured in desired positions to receive a circular pin or rod 13.

The leg 14, which is of hollow semi-cylindrical or channel section, is of such a width and so shaped at the top that it fits between the flanges of the bracket 10 and towards one end the flanges at the sides of the top of the leg are apertured and the parts so disposed that the apertures in the flanges of the bracket are aligned with the apertures on the flanges of the leg. The rod or pin 13 is passed through these aligned apertures and one end of the rod preferably is formed with a snap or other head and when the parts are placed in position the end of the rod projects on the exterior of the channel bracket. The rod is retained in position by riveting over this end as shown or by screwing thereon a nut, or by means of a split pin or otherwise, and the arrangement is preferably such that the flanges of the bracket channel grip the flanges of the leg channel in a frictional manner. The upper end of the leg flanges at the corner remote from the base of the leg channel are preferably rounded as shown at 15, and at the other corner 16 where they join the base of the leg channel are left square, and the arrangement is preferably such that when the leg is turned to the in-action position, this square end comes just beneath the base of the bracket channel whilst the rounded corners allow the leg to be turned to the folded position when required.

The flanges of the bracket channel are given a required shape which includes a somewhat quadrant shaped portion 17, having a centre at the centre of the leg pivot 13. Each such flange has a similar shape, and the lower end of each quadrant ends in a notch 18 which projects upwardly into the material of the flange and is of gradually diminishing width. The bounding edge of the notch on the side remote from the quadrant extends below the bounding edge of the notch on the other side to form a stop 19 as hereafter explained. At the other end of each quadrant the flange is shaped into a small notch or recess 20 and beyond this the bounding outline of the flange extends horizontally for a required distance and then upwardly to merge into the base of the channel.

Each flange of the leg channel is formed in a desired position with an elongated slot 21, the slot in one flange coming opposite to the slot in the other flange. A pin or rod 22 of circular or other section passes through these slots and across the leg channel, and the ends project a required extent. The slots 21 are in such a position that when the pin 22 is at the outer extremity of the slots, the leg 14 can be turned so that the projecting portions of the pin 22 clear the quadrants 17 of the bracket 10, but come against the longer side 19 of the notches before referred to, which act as stops. The pin 22 is of such diameter or section that its projecting ends can enter the converging notches 18 and make contact with the sides thereof before coming into contact with the base of the notch. A tension spring 23 or springs connect the pivot pin 13 or a distance sleeve 24 around the pin 13 with the pin 22 passing through the slots 21 and the ends of this last-mentioned pin may have heads thereon, the under surfaces of which come on the exterior of the surfaces of the flanges of the bracket channel. In addition, these heads may be formed if required with enlarged manipulating portions (not shown) preferably attached to their rod by pins. As shown in the drawing, however, the ends of the pin 22 are furnished with washers and retaining split pins 24, and it will be realized that any other suitable device may be employed.

The arrangement of the parts is such that when the leg is in the folded position, the projecting portions of the rod 22 lie in the shallow recesses 20 at one end of the quadrants 17 and are held there by the spring tension. When it is desired however to bring the leg 14 into the in-action position, it is turned and the pressure is sufficient to cause the pin 22 to spring from these shallow recesses 20. The projecting ends of the rod 22 pass over the surfaces of the quadrants 17 until the converging recesses 18 are reached, when the spring 23 or springs pull this detent rod 22 up into the converging notches 18. The detent rod 22 is held firmly in position against the tapering sides of the notches by means of the spring and thus the leg 14 is held firmly in position.

The leg is of desired length, and the flanges or what may be termed the flanges of the channel member from which it is formed may be of decreasing depth towards the lower end as shown. Similarly also the width of the channel may decrease towards the lower end if desired.

In place of forming a leg from a channel member it may be formed from a member of any suitable section, the section preferably being such that it is of adequate strength for the purpose for which the leg is designed. For instance it may, except for its upper portion, be formed from a hollow somewhat semi-cylindrical portion which is the section employed in the construction shown in the drawing.

Preferred constructions of leg are formed from sheet metal bent into a required section or shape and may include integral ribs, flutes, double-over or bent back portions, or otherwise. In addition, in suitable positions they may have attached thereto strengthening ties, struts, pins, bolts or otherwise.

Although a leg made from metal of suitable section is particularly suitable in some cases it may be made from wood and in other cases from a combination of wood and metal. In a preferred form of the last-mentioned type of leg, the portion of the leg having the pivot and the detent device may be formed from metal and the lower portion of the leg may be of wood, the parts being suitably connected or jointed together, for example the construction may be similar to that already particularly described for the upper part of the leg and into the channel section the upper portion of a wooden leg may be suitably fixed.

Although a bracket having channel section is described, and is particularly suitable for the purposes of the invention, in some cases the bracket may be of other form, for example it might comprise a single downwardly projecting member and the upper end of the leg could be made forked to come on each side of the bracket and be mounted upon a pin carried by the bracket. In this case a suitable form of spring detent could be utilized.

With some constructional forms of the invention, it is advantageous, for example as particularly described, to mount the spring detent device on the leg and to form the bracket with a co-operating notch or notches, but in other cases a spring detent or detents can be carried by the bracket and the leg have the required co-operating notch or notches.

In fitting a set of legs made according to the invention beneath an article of furniture, for example a table top such as 12, they are disposed so that in the folded position the legs come in suitable positions. For example, they may be so fitted that when folded the legs lie side by side, or they may be fitted so that the legs cross, and in still further cases with legs of appropriate section, in the folded position the legs may lie one upon or one within the other. The last-mentioned construction is illustrated in Fig. 6 where one leg having its pivot at the left hand side is first folded against the under side of the table and then the other leg folded up to come beneath and enclose the upper leg; the general tapering of the leg permitting this nesting action. The leg shown in Figs. 1 to 6 also includes at the lower end a foot member 25 riveted, welded or otherwise attached thereto.

Where required, means may be provided for interconnecting two or more legs so that they move about their pivot together, for example in some cases a stay or tie bar may connect two legs at one end of a table so that these can be moved to the in-action or out-of-action position together. Again, the legs may be furnished with means by which when in the in-action position, they may be connected by suitable ties, for example, one leg may be formed or provided with an eye or similar device, whilst the other leg may have a hook or other tie.

Such a mechanism as herein described may form the operative portion of any suitable device, other than a leg for furniture.

Another form of such a device is illustrated in Figs. 7, 8 and 9 and comprises a desk, shelf or the like 26 adapted to be turned to two positions, one where it is folded out of the way (dotted lines Fig. 7) and the other where it is in the position for use (full lines Fig. 7). In this case the fixed bracket 10 is attached by the base of its channel for example to a wall or other vertical surface 27 so that the arm 14a in place of the leg 14 can be turned up into one extreme position and out into another extreme position. Such arm has riveted or otherwise attached thereto the supporting shelf or slope 26 which may have a lower upstanding flange 28 alone or both a lower flange 28 and an upper flange 29. This slope 26 may project on either side to a desired extent as shown and be adapted to receive a book or books or otherwise.

One particular use for such a device consists in supporting a telephone directory and the shelf or slope 26 can be made of such size that the lower and upper flanges 28 and 29 bound the edges of the book and means such as a rod 30 passing through apertures in the two flanges and having fixed or movable abutments at the ends may be provided for retaining the book in position. In the form shown in the drawing, one end of the rod has a riveted head and the other end projects through the flange 29 and is retained in position by a split pin 31 engaging in an aperture in the end of the rod.

With such a device, in place of mounting the parts so that the arm turns up and outwards as shown, the device may be so mounted that the arm 14a turns downwards and outwards. In using such a device it will be realized that it is of great advantage, especially in confined spaces such as the interior of a telephone booth or otherwise, as it enables a telephone directory always to be available and to be turned into a readily accessible position while it is being consulted, in which position it is also supported, and when not required enables it to be turned out of the way.

Where required, such a shelf or slope may have flanges or the like at its other sides, or at any of its sides, and in addition if required may be furnished with other means than those described for temporarily attaching thereto any paper, book or otherwise to be supported.

When such a shelf or the like is utilized, its surfaces may be so constituted that they have thereon or are adapted to carry indications or announcements, for example with the shelf or the like for supporting a telephone directory, the under surface 32 of such shelf or the like, when in the out of action position, may be utilized to show advertisements, indications or otherwise.

With similar devices, but of larger size, where required more than one pivoted arm and associated relatively fixed bracket or the like may be utilized to carry the shelf, slope or other surface it is desired to be able to move into two extreme positions.

The movable arm or the like is formed of desired length and its flanges may be of decreasing depth towards the free extremity and similarly the width may also decrease towards the free extremity if desired.

In place of forming the movable part from a channel member it may be formed from a member of any suitable section, providing the section is of adequate strength for the purpose for which it is designed.

Preferred constructions of the movable member are formed from sheet metal bent into a required section or shape and may include integral ribs, flutes, doubled over or bent back portions or otherwise. In addition, in suitable positions they may have attached thereto strengthening ties, struts, pins, bolts or otherwise.

Although a movable member made from metal of suitable section is particularly suitable, in some cases it may be made from wood and in other cases from a combination of wood and metal. In a preferred form of the last-mentioned type the portion of the moving member having a pivot and a detent device may be formed from metal and the other portion of wood, the parts being suitably connected or jointed together.

Although a fixed bracket of channel section is described and is particularly suitable for the purpose of the invention, in some cases the bracket may be of other form, for example it might comprise a single member, in place of the two flanges and the end of the movable member could be made forked, coming on each side thereof and be mounted upon a pin carried by the fixed bracket. In this case a suitable form of spring detent may be utilized.

With some constructional forms of the invention, it is advantageous to mount the spring detent on a movable member and to form the fixed bracket with the co-operating notches, but in other cases a spring detent or detents can be carried by the relatively fixed bracket and the movable member have the required co-operating notch or notches.

It should be realized that pivotally connected relatively fixed and movable members, especially of the particular construction herein described, can be utilized for a great variety of purposes and the invention is not limited to the particular examples given. Moreover, although in the particular description notches are provided for retaining the movable member in two extreme positions, it will be realized that in some cases other intermediate notches may be provided for retaining the movable member in an intermediate position or positions.

The invention is not limited to the precise forms or details of construction described, as these may be varied to suit particular cases.

What I claim and desire to secure by Letters Patent of the United States of America is:—

A joint unit, comprising a pivoted table leg having an elongated slot, a channel bracket enclosing the top of the leg and having a quadrant surface on the sides thereof, and a shallow notch, a pin traversing said bracket and serving as a pivot for the leg, said leg having a portion adapted to abut against the channel bracket in the extended position to form a positive stop, a second pin traversing said leg through the elongated slot therein, and resting against the quadrant surface on the sides of the bracket and engageable into the shallow notch when the leg is folded, said quadrant having a deep notch at such a position that the said second pin enters therein when the leg is extended, and a spring between said pivot pin and said second pin tending to press the latter against the said quadrant surface.

ERNEST LODGE WILSON.